United States Patent
Dhalleine et al.

(10) Patent No.: US 9,259,017 B2
(45) Date of Patent: Feb. 16, 2016

(54) PROCESS FOR MANUFACTURING SOLUBLE AND FUNCTIONAL PLANT PROTEINS, PRODUCTS OBTAINED AND USES

(75) Inventors: Claire Dhalleine, Compiegne (FR); Damien Passe, Douai (FR)

(73) Assignee: ROQUETTE FRERES, Lestrem (FR)

( * ) Notice: Subject to any disclaimer, the term of this patent is extended or adjusted under 35 U.S.C. 154(b) by 65 days.

(21) Appl. No.: 13/637,029

(22) PCT Filed: Apr. 8, 2011

(86) PCT No.: PCT/FR2011/050796
§ 371 (c)(1),
(2), (4) Date: Sep. 25, 2012

(87) PCT Pub. No.: WO2011/124862
PCT Pub. Date: Oct. 13, 2011

(65) Prior Publication Data
US 2013/0017310 A1    Jan. 17, 2013

(30) Foreign Application Priority Data
Apr. 9, 2010   (FR) ...................... 10 52702

(51) Int. Cl.
*A23J 3/14*     (2006.01)
*A23L 1/305*    (2006.01)

(52) U.S. Cl.
CPC ... *A23J 3/14* (2013.01); *A23L 1/305* (2013.01)

(58) Field of Classification Search
USPC ....................................................... 426/656
See application file for complete search history.

(56) References Cited

U.S. PATENT DOCUMENTS

| | | | |
|---|---|---|---|
| 4,072,670 A * | 2/1978 | Goodnight et al. | 530/378 |
| 4,371,562 A | 2/1983 | Friedman et al. | |
| 4,530,788 A | 7/1985 | Chang | |

FOREIGN PATENT DOCUMENTS

| | | |
|---|---|---|
| CA | 974397 | 9/1975 |
| EP | 0 352 062 | 1/1990 |
| FR | 2 202 652 | 5/1974 |

OTHER PUBLICATIONS

Song, H. et al. "Overviews of technology of modifying soybean protein concentrate by alcohol leaching" *Science and Technology of Cereals, Oils, and Food*, 2008, pp. 20-22, vol. 16, No. 2.
Otlewski, J., et al. "Unfolding kinetics of bovine trypsinogen," *European Journal of Biochemistry*, 1996, vol. 242, pp. 601-607.
Written Opinion in International Application No. PCT/FR2011/050796, Aug. 31, 2011, pp. 1-7.

\* cited by examiner

*Primary Examiner* — Elizabeth Gwartney
(74) *Attorney, Agent, or Firm* — Saliwanchik, Lloyd & Eisenschenk

(57) ABSTRACT

The invention relates to a process for manufacturing soluble and functional plant proteins, characterized in that it comprises at least one functionalizing step that consists of a treatment of 0.01 s to 1 s constituted of a step of heating plant proteins at a temperature of 100° C. to 160° C. and a step of cooling the heated plant proteins. The invention also relates to a process for converting non-functional plant proteins to functional proteins. Another subject of the invention is a plant protein, characterized in that it has a solubility in water of greater than 50% (with the exception of a potato protein for which the solubility in water is 25%), an emulsifying capacity between 700,000 mPa·s and 1,200,000 mPa·s for a sample directly placed at 4° C. for 24 h (with the exception of a potato protein for which the emulsifying capacity for a sample directly placed at 4° C. for 24 h is between 400,000 mPa·s and 600,000 mPa·s) and between 500,000 mPa·s and 1,100,000 mPa·s for a sample treated at 75° C. then placed at 4° C. for 24 h and an emulsifying capacity between 70% and 95%. A further subject of the invention is the use of said plant protein in the manufacture of food.

8 Claims, No Drawings

PROCESS FOR MANUFACTURING SOLUBLE AND FUNCTIONAL PLANT PROTEINS, PRODUCTS OBTAINED AND USES

CROSS-REFERENCE TO RELATED APPLICATION

This application is the U.S. national stage application of International Patent Application No. PCT/FR2011/050796, filed Apr. 8, 2011.

FIELD OF THE INVENTION

The present invention relates to a process for manufacturing soluble and functional plant proteins, which are consequently more suitable for use in food compositions.

PRIOR ART

The daily needs of proteins are between 12% and 20% of the food ration. These proteins are provided both by products of animal origin (meats, fish, eggs, dairy products) and by plant foods (cereals, leguminous plants, algae).

However, in industrialized countries, protein supplies are mainly in the form of proteins of animal origin. Now, numerous studies have demonstrated that excessive consumption of proteins of animal origin to the detriment of plant proteins is one of the causes of increase in cancers and cardiovascular diseases.

Moreover, animal proteins have numerous disadvantages, both as regards their allergenicity, especially concerning proteins derived from milk or eggs, and in environmental terms in relation with the harmful effects of intensive rearing.

Thus, there is an increasing demand from mass producers for compounds of plant origin that have advantageous nutritional and functional properties without, however, having the drawbacks of compounds of animal origin.

The compounds of plant origin under consideration in the present application may be derived from oleaginous plants, leguminous plants, cereals or starchy plants by reduction or removal of some of the main non-protein constituents (water, oil, fibres, minerals, starch and other carbohydrates) so as to obtain a protein content ($N_{6.25}$) of 60% or more. The protein content is calculated on the basis of the dry weight with the exclusion of the vitamins and mineral salts.

Plant protein materials are increasingly used in food applications. This requires that these protein materials have not only satisfactory nutritional properties, but also an acceptable flavour and acceptable functional properties, for example good solubility and also adequate emulsion, gelling, water-retention, foaming and texturing characteristics. In general, the term "functional properties" of food ingredients means any non-nutritional property. These various properties contribute towards obtaining the desired final characteristics of the food.

The choice of processes for preparing the plant protein compositions has a direct influence on the foaming, emulsion, emulsifying or gelling properties of the protein compositions obtained. For example, as regards milk proteins (caseins, caseinates), the functional properties of lactoserum proteins may be improved by modifying the medium (electrodialysis, ultrafiltration, ion exchange), by heat-denaturing at neutral or acidic pH, in batch mode or via continuous treatments (scraped-surface exchangers, cooking-extrusion). These treatments, in particular heat treatment (Klepacka et al. Effect of heat treatment on chemically modified proteins of legume seeds. Food chem. 1997; 58: 219-22), lead to denaturing of the native proteins. Such denaturing of the native proteins may result in total unfolding of the molecule. The presence of water promotes denaturing. Thus, in a system comprising a hydrophilic phase and a hydrophobic phase, the proteins denatured by the action of temperature place themselves at the hydrophilic/hydrophobic interface. The denaturing of proteins thus modifies their properties, in particular inducing a reduction in solubility by demasking hydrophobic groups.

For the key aspect of the solubility in water of protein compositions, native proteins are generally hydrolysed or proteolysed in order to increase their solubility.

Moreover, the industry is seeking to simplify the processes for manufacturing protein products, which is reflected especially by a limitation of the product manufacturing times and a reduction of the costs. However, such a simplification of the manufacturing processes must not impair either the texture or the functional, nutritional, sensory and organoleptic properties of the protein compositions.

The main objective of the present invention is thus to find a simple and inexpensive process for manufacturing soluble plant proteins that have good emulsion, emulsifying and gel capacities, which are intended to be used in a wide variety of food or non-food compositions.

Various attempts have already been made to achieve such an objective. In particular, the direct enzymatic proteolysis of natural proteins is described in U.S. Pat. No. 2,489,208 and U.S. Pat. No. 3,889,001. This process normally uses small amounts of enzymes over prolonged reaction periods. The yield of soluble functional proteins in these processes is ordinarily low and the product is of mediocre quality as regards its flavour.

An enzymatic treatment of a protein that has been heat-treated beforehand was described in U.S. Pat. Nos. 3,857,966 and 3,876,806.

In the first of these patents, a heat-precipitated and isolated protein is initially subjected to alkaline hydrolysis at high temperature and then to proteolytic hydrolysis in series which uses both an alkaline and neutral microbial protease and a plant protease originating from seeds, freed of the fats. The said protein is thus initially heat-treated to destroy the vegetative cells and is then subjected to enzymatic proteolysis to form a soluble protein. The separation of the water-insoluble matter is performed after rather than before the proteolysis, and the product thus contains not only the soluble protein, but also water-soluble impurities present in the material used as protein source.

Moreover, the problem becomes even more difficult when it is a matter of applying the functionalization process to substantially non-denatured plant proteins with a protein content of greater than 60% on a dry basis, a solids content of greater than 15% and a viscosity at 20° C. of greater than or equal to 10 000 mPa·s.

Patent EP 0 013 093 describes a process in which the solubility of soybean proteins is improved by a treatment at a high temperature (from 50° C. to 150° C.) and at a pH of between 6.5 and 9. A high shear force and a high pressure are necessary in this process, which is characterized by successive pressure/cavitation cycles. Such a shear force induces substantial protein denaturing, which corresponds to disorganization of the spatial structure of the proteins. The polypeptide chains constituting the proteins are then partially or totally unfolded. Such a shear force may also induce cleavage of the covalent bonds, in particular of the peptide bonds. The polypeptide chains constituting the proteins are then partially or totally cleaved.

Patent application FR 2 202 652 describes a denaturing heat-treatment process that may be applied to low-concentration protein suspensions (6% to 8% by weight of proteins). The said denaturing treatment is followed by an enzymatic hydrolysis to obtain dissolved polypeptides.

A "high-temperature (80° C. to 95° C.) long (1 to 120 minutes)" heat treatment was described in patent EP 0 522 800, in order to produce proteins of improved functionality. The said proteins especially have a very good emulsifying capacity, but poor water solubility.

U.S. Pat. No. 4,530,788 also describes a "high-temperature (70° C. to 121° C.) long (15 to 45 minutes)" heat treatment for functionalizing plant proteins. However, such a treatment is applied to protein solutions with a low solids content (about 5% to 10%, preferentially 3.5% to 9.5%). The said document moreover discloses that the maximum heating time depends on the protein concentration. With regard to this document, it therefore goes against a technical preconception of imagining a protein functionalization process of very short duration which may be applied to protein extracts with a high solids content, and especially with a solids content of greater than 15% by weight.

From all the foregoing, it results that there is an unsatisfied need for substantially non-denatured plant proteins with a protein content of greater than 60% on a dry basis and with a solids content of greater than 90% and also with good water solubility, i.e. greater than 500 g/l, that is to say 50% (with the exception of potato proteins for which a good solubility corresponds to a solubility of greater than 250 g/l, that is to say 25%), and with noteworthy functional properties, such as their emulsion, emulsifying and gel capacities.

SUMMARY OF THE INVENTION

The Applicant Company has, to its credit, discovered that substantially non-denatured plant proteins can, surprisingly, have both good water solubility and good functional properties. The Applicant Company has also discovered, unexpectedly, that the process for manufacturing soluble and functional plant proteins can be applied to protein extracts with a high protein content, a high solids content and a high viscosity.

The Applicant Company has succeeded in reconciling all these objectives, which were hitherto reputed to be sparingly compatible, by proposing a process for manufacturing soluble and functional plant proteins, characterized in that it comprises at least one functionalization step consisting of a treatment of 0.01 to 1 s consisting of:
  a step of heating soluble plant proteins to a temperature of 100° C. to 160° C.;
  a step of cooling the said heated plant proteins.

The invention also relates to a process for transforming non-functional plant proteins into functional plant proteins, characterized in that it comprises at least one functionalization step that consists of a treatment for 0.01 to 1 s as described above.

A subject of the present invention is also plant proteins characterized in that they have:
  a water solubility, measured according to a test A, of greater than 50% and preferentially between 55% and 95%;
  an emulsion capacity, measured according to a test C, of between 700 000 mPa·s and 1 200 000 mPa·s and preferentially between 750 000 mPa·s and 1 200 000 mPa·s for a sample placed directly at 4° C. for 24 hours and between 500 000 mPa·s and 1 100 000 mPa·s for a sample treated at 75° C. and then placed at 4° C. for 24 hours;
  an emulsifying capacity, measured according to a test B, of between 70% and 95%.

A subject of the present invention is also potato proteins, characterized in that they have:
  a water solubility of greater than 25%;
  an emulsion capacity, measured according to a test C, of between 400 000 mPa·s and 600 000 mPa·s for a sample placed directly at 4° C. for 24 hours and between 500 000 mPa·s and 1 100 000 mPa·s for a sample treated at 75° C. and then placed at 4° C. for 24 hours;
  an emulsifying capacity, measured according to a test B, of between 70% and 95%.

In addition, a subject of the present invention is a composition characterized in that it comprises at least one plant protein obtained according to the process of the invention or having the solubility characteristics and the emulsion and emulsifying capacities according to the invention. This composition according to the invention is most particularly intended to be used in human and animal food products, but also for any use in fields as diversified as pharmacy, cosmetics, agrochemistry, construction materials, adhesive glues and cardboards.

The present invention thus also comprises the use of soluble and functional plant proteins in accordance with the present invention in the various technical fields mentioned previously, and in particular in the manufacture of foods. More particularly, the plant proteins according to the invention may be used in the manufacture of animal feed and also of human food, especially in the field of infant food, but also in fields such as the fermentation and production of excipients.

DETAILED DESCRIPTION

The present invention relates to a process for manufacturing a soluble and functional plant protein. The said process is characterized in that it comprises at least one functionalization step that consists in heating native plant proteins, placed in suspension beforehand, to a temperature of 100° C. to 160° C. and then in rapidly cooling the said heated plant proteins so that the functionalization step does not exceed one second. Preferably, the said proteins used, in the form of a protein extract, have a protein content ($N_{6.25}$) of greater than 60% on a dry basis, a solids content of greater than 15% and a viscosity at 20° C.±2° C., measured according to test E, of between 10 000 mPa·s and 100 000 mPa·s.

In the present invention, the protein content ($N_{6.25}$) is determined by assaying the soluble nitrogen fraction according to the method of Dumas A., 183, Annales de chimie et de physique, No. 2.47, pp 198-213, as cited by Buckee, 1994, in the Journal of the Institute of Brewing, 100, pp 57-64, then the said nitrogen fraction thus determined and expressed as a weight percentage of dry product is multiplied by the factor 6.25. This method is well known to those skilled in the art.

In the present invention, the term "plant protein" denotes any protein derived from cereals, oleaginous plants, leguminous plants or tuberous plants. These proteins may be used alone or as mixtures, chosen from the same family or from different families.

For the purposes of the present invention, the term "leguminous plants" means any plant belonging to the family of Cesalpiniaceae, Mimosaceae or Papilionaceae and especially any plant belonging to the family of Papilionaceae, for instance pea, haricot bean, broad bean, horse bean, lentil, alfalfa, clover or lupin.

According to a preferred embodiment of the invention, the plant protein is a leguminous plant protein.

According to another preferred embodiment, the leguminous plant protein is chosen from the group comprising pea, haricot bean, broad bean and horse bean, and mixtures thereof.

Even more preferably, the said leguminous plant protein is pea protein.

The term "pea" is considered here in its most widely accepted sense and in particular includes:
- all the wild varieties of "smooth pea", and
- all the mutant varieties of "smooth pea" and of "wrinkled pea", irrespective of the uses for which the said varieties are generally intended (human food, animal nutrition and/or other uses).

The term "soluble protein" used in the present invention denotes any protein (other than potato protein), which is native or non-native, especially any pulverulent protein (in powder form) or any protein extract which has a water solubility, measured according to a test A, of between 35% and 99%, more preferentially between 45% and 90% and even more preferentially between 50% and 90%. When applied in the present invention to a potato protein, the term "soluble protein" denotes any potato protein whose solubility is greater than 25% according to test A.

This test A consists in determining the solids content in water at pH 7.5 via a method of dispersing a test sample of protein or of protein extract in distilled water and analysis of the supernatant obtained after centrifugation.

A test sample of exactly 2.0 g and a magnetic bar (reference No. ECN 442-4510/VWR company) are placed in a 400 ml beaker. The whole is tared and 100.0 g of distilled water at 20° C.±2° C. are then added.

The pH is adjusted to 7.5 with 1N HCl or 1N NaOH and the mixture is made up to exactly 200.0 g with distilled water.

This mixture is stirred for 30 minutes and then centrifuged for 15 minutes at 3000×g.

After centrifugation, exactly 25.0 g of supernatant are withdrawn into a pretared crystallizing dish. The dish is placed in an oven at 103° C. to constant mass.

The water solubility is calculated by means of the following equation:

$$\text{Solubility} = \frac{(m1 - m2) \times 200 \times 100}{m3 \times P}$$

with
- m1=mass in g of the crystallizing dish after drying
- m2=mass in g of the empty crystallizing dish
- m3=mass in g of the supernatant taken up
- P=mass in g of the test sample.

The term "functional" used in the present invention denotes any non-nutritional property, besides the solubility. These various properties of the plant proteins in accordance with the invention contribute towards obtaining the desired final characteristics for the product into which they are incorporated. In the present application, the term "functional" is more particularly associated with the emulsion, emulsifying and gel capacities of the plant proteins according to the invention.

The manufacturing process according to the invention constitutes a simple and inexpensive means for manufacturing a soluble and functional plant protein.

The plant proteins subjected to the process according to the invention may be obtained by performing various preparation processes. Advantageously, they are prepared via the process described below.

The first step of the preferred preparation process consists in suspending a plant flour or gratings, if grated tuberous plants are concerned, in water. In the present invention, the term "plant flour" is understood in the broad sense, whether it is an actual plant flour or tuberous plant gratings, especially potato gratings. Specifically, the said plant flour may be derived from cereals, oleaginous plants, leguminous plants or tuberous plants, used alone or as mixtures, chosen from the same family or from different families.

The suspension step is followed by an extraction of the starch and the fibre so as to obtain a protein suspension with a solids content of 3% to 15% by weight. At this step, however, when the plant is wheat or potato, the proteins are extracted first, while the starch and the fibre are extracted in a second stage.

The plant proteins are then extracted from the protein suspension so as to obtain an extract of soluble native proteins with a solids content of greater than 15% by weight.

In the present invention, the term "native protein" denotes any protein isolated from a plant source and being substantially non-denatured, such that it conserves good water solubility, i.e. a solubility of greater than 50% (with the exception of potato proteins, for which good solubility corresponds to a solubility of greater than 25%). An advantageous aspect of the present invention is that of functionalizing plant proteins while at the same time maintaining their good solubility.

The isolation step, also commonly known as the extraction step, may consist of any process for obtaining a protein extract that is well known to those skilled in the art, such as isoelectric precipitation or impregnation followed by a separation technique via screening, filtration, centrifugation or any other equivalent technique.

According to one preferred embodiment, the isolation step is performed by flocculation, i.e. by isoelectric precipitation, followed by recovery of the flocculated proteins by means of a plate separator and/or a centrifugal decanter (DA 250 separator, GEA Westfalia and CA 505 decanter, GEA Westfalia).

The native plant protein extract thus obtained is then subjected to a functionalization step consisting of two distinct steps: (i) a heating step, advantageously performed by heat exchange with water vapour, and (ii) a cooling step, preferentially performed by lowering the pressure to below 300 mbar absolute.

In one particular process according to the invention, the heating step takes place in an infusion chamber. However, it is possible to make use of any suitable heating system. In particular, the heating step may be performed by injection rather than by infusion. The injection heating process is also a process of direct exchange, i.e. a process with contact between the product and the heat exchanger, and the temperature rise is thus instantaneous. In the preferred embodiment of the present invention, the heat exchanger corresponds to water vapour.

The plant protein extract is conveyed directly into the infusion chamber. Specifically, the Applicant Company went against a technical preconception by applying the process to a protein extract with a viscosity at 20° C.±2° C., measured according to test E, of between 10 000 mPa·s and 100 000 mPa·s. The high viscosity of the extract and its aptitude to form a "crust" at the surface of the chamber suggest to a person skilled in the art that a heat-treatment installation is unsuitable for performing the process according to the invention. Furthermore, the native plant protein extract subjected to the functionalization step preferentially has a protein content of greater than 60% on a dry basis and a solids content of greater than 15%.

According to the process of the invention, a positive pump of Moineau type (sold under the brand name PCM) transfers the protein extract into the infusion chamber, ensuring a constant and stable pressure and feed rate for the chamber. The protein extract arrives into the chamber at a temperature of 20° C. to 70° C.

The heating step is performed by dispersing, circularly, the protein extract in water vapour under pressure. This heating step thus corresponds to a direct exchange process. The protein extract flows vertically and mixes with the vapour without any risk of contact with the hot wall of the infusion chamber. Each stream of protein extract is the site of a flow that ensures, with the exchange surface engaged, efficient heat transfer. The protein extract is instantly heated to a temperature of between 100° C. and 160° C. in less than 0.1 second. The heating process in the infusion chamber must be very precise.

During this heating step, it may be necessary to ensure a precise acclimatization time, for example from 0.1 to 0.8 second, after reaching the desired temperature.

In the present invention, the term "acclimatization" denotes any operation in which the protein extract resides at a temperature of between 100° C. and 160° C. for a precise time.

After heating in the infusion chamber, the heated protein extract falls directly into a positive pump (lobe pump).

On exiting the pump, the heated protein extract is cooled by pressure reduction while rapidly transferring the hot dispersion into a pressure-reduction chamber at a lower pressure than that used during the heating or into an expansion vessel to bring about a release of vapour in an empty chamber. Preferably, the protein extract is cooled by lowering the pressure in an expansion vessel.

In this step, it is desirable to obtain maximum vaporization and it is possible to choose pressures or pressure reductions (vacuum) making it possible to achieve this aim. It is thus possible to modify the amount of dry extract by evaporating off a variable amount of water. Simultaneously, by means of the evolution of vapour, substantial deodorization is obtained.

In this step in particular, the Applicant Company came up against numerous extraction problems especially as regards the pump for extracting the protein extract placed at the outlet of the expansion vessel under vacuum.

Specifically, given the thixotropic nature of plant proteins, especially pea protein, it goes against a technical preconception to perform a process according to the invention applied to such protein extracts. Despite this preconception, the Applicant Company used, after considerable research, a Moineau-type positive pump (sold under the brand name PCM) installed directly at the outlet of the expansion vessel. Said pump, preferentially combined with a stirring rotor for shearing the protein extract at the outlet of the expansion vessel, enabled a stable production of soluble and functional plant proteins. The pH of the protein extract may be rectified before or after the functionalization step. Said pH of the protein extract is thus preferentially brought to be between 6.2 and 9 pH units.

Advantageously, the soluble and functional protein extract may be subjected to a scrapped-surface exchanger after the functionalization step. Excellent results were obtained using a Contherm scrapped-surface exchanger (TetraPack) at inlet and outlet temperatures of, respectively, 70° C.±2° C. and 95° C.±2° C. and at 100 rpm for 1 minute.

The soluble and functional proteins derived from the manufacturing process according to the invention have, after the functionalization step, i.e. just after the heat treatment:

a water solubility of greater than 50% (with the exception of potato proteins, which have a water solubility of greater than 25%;

an emulsion capacity, measured according to a test C, of between 700 000 mPa·s and 1 200 000 mPa·s and preferentially between 750 000 mPa·s and 1 200 000 mPa·s for a sample placed directly at 4° C. for 24 hours, and between 500 000 mPa·s and 1 100 000 mPa·s for a sample treated at 75° C. and then placed at 4° C. for 24 hours;

an emulsifying capacity, measured according to a test B, of between 70% and 95% (with the exception of potato proteins, which have an emulsifying capacity of between 65% and 95% and preferentially between 70% and 95%);

a viscosity at 20° C.±2° C., measured according to a test E, of greater than or equal to 23 000 mPa·s.

Finally, the soluble and functional proteins derived from the manufacturing process according to the invention are subjected to a drying step so as to obtain pulverulent proteins. The drying step is performed according to a technique such as atomization, granulation, extrusion or by any other drying means known to those skilled in the art, and under conditions suited to the chosen equipment. Preferably, the soluble and functional plant proteins derived from the manufacturing process according to the invention are redissolved in water and subjected to an atomization step.

The pH of the proteins may be rectified before atomization according to the desired target pH for the final application.

Between the functionalization step and the drying step, the manufacturing process according to the invention may also comprise a shear treatment on the functional plant proteins, such as high-pressure homogenization or a high-shear pump. Excellent results were obtained using an APV-SPX two-stage high-pressure homogenizer (150 bar and 40 bar).

Implementation of the process according to the invention makes it possible to obtain a plant protein with good solubility, i.e. a solubility at 20° C.±2° C., measured according to the test A, of greater than 50% (with the exception of potato proteins, for which good solubility corresponds to a solubility of greater than 25%), after the manufacturing process (plant protein powder according to the invention), and also excellent emulsion capacities, according to test C, and emulsifying capacities, according to test B. More specifically, the pulverulent plant proteins according to the invention, other than the potato proteins, have, after the drying step:

a water solubility of greater than 50% (with the exception of potato proteins, which have a water solubility of greater than 25%);

an emulsion capacity of between 700 000 mPa·s and 1 200 000 mPa·s and preferentially between 750 000 mPa·s and 1 200 000 mPa·s for a sample placed directly at 4° C. for 24 hours (with the exception of potato proteins, which have an emulsion capacity of between 400 000 mPa·s and 600 000 mPa·s for a sample placed directly at 4° C. for 24 hours), and between 500 000 mPa·s and 1 100 000 mPa·s for a sample treated at 75° C. and then placed at 4° C. for 24 hours;

an emulsifying capacity of between 70% and 95% (with the exception of potato proteins, which have an emulsifying capacity of between 65% and 95% and preferentially between 70% and 95%);

a viscosity at 20° C. of greater than or equal to 21 000 mPa·s for a product with a solids content of 16%.

The pulverulent potato proteins according to the invention have, after the drying process:
- a water solubility of greater than 25%;
- an emulsion capacity of between 400 000 mPa·s and 600 000 mPa·s for a sample placed directly at 4° C. for 24 hours, and between 500 000 mPa·s and 1 100 000 mPa·s for a sample treated at 75° C. and then placed at 4° C. for 24 hours;
- an emulsifying capacity of between 65% and 95% and preferentially between 70% and 95%.

The pulverulent plant proteins according to the invention also have, after the drying process, a solids content of greater than 92%.

In the present invention, the Emulsifying Capacity (referred to hereinbelow as "EC") corresponds to the percentage of stable emulsion "cream" formed after centrifugation, as a function of a certain concentration of proteins and of oil, using a Polytron homogenizer (of PT 45-80 type, equipped with an Easy-clean dispersing aggregate reference B99582/Bioblock company).

More specifically, this test, noted test B, consists in:
- preparing, in a high-sided 2 l jar (23.5 cm deep, 11.5 cm in diameter) a protein solution equivalent to 2.0% of proteins $N_{6.25}$ in 250 ml of demineralized water,
- introducing a magnetic bar (reference No. ECN 442-4510/VWR company),
- mixing the protein solution for 10 minutes on a magnetic stirrer of IKA® RCT Classic brand, at a speed of 1100 rpm,
- preparing 250 ml of food-grade rapeseed oil,
- removing the magnetic bar,
- immersing the Polytron dispersing aggregate (PT 45-80) in the protein solution to mid-height of the protein solution,
- setting the stirring speed to 5.5 (between 5 and 6), i.e. between 15 200 and 15 450 rpm,
- starting the stirring and pouring in the 250 ml of rapeseed oil over 1 minute,
- transferring the emulsion into a beaker,
- weighing out twice exactly 35.0 g of the emulsion in two 50 ml graduated centrifuge tubes,
- centrifuging at 1500×g for 5 minutes, at 20° C.,
- measuring the volume of the foam after centrifugation,
- measuring the total volume after centrifugation (pellet+water+foam),
- checking the repeatability between the two tubes and between two identical tests.

The Emulsifying Capacity will be determined by calculation, by means of the following equation:

$$EC = \frac{\text{Volume of foam after centrifugation}}{\text{Total volume after centrifugation}} \times 100$$

The functional plant proteins according to the invention preferably have an emulsifying capacity, measured according to test B, of between 65% and 95% and preferentially between 70% and 95%.

In the present invention, the emulsion capacity is measured according to test C described below:
- prepare a protein suspension by incorporating 50 g of sample (atomized functional plant protein powder) in 250 g of distilled water at 20° C.±2° C. with vigorous stirring for 2 minutes at a speed of 250 rpm;
- incorporating into the suspension 250 g of sunflower oil as a trickle over 30 seconds with continued vigorous stirring at a speed of 250 rpm;
- leave to stir for 2.5 minutes;
- add 11 g of fine cooking salt to the protein/water/oil mixture;
- continue stirring for 30 seconds at 250 rpm;
- fill 3 storage jars with the protein/water/oil/salt mixture;
- crimp seal the jars;
- place the first jar at 4° C.±2° C. in a refrigerator for 24 hours;
- pasteurize the second jar for 1 h 30 minutes on a water bath at 75° C.±2° C. and then place it in a cold water bath for 1 hour and store said jar at 4° C.±2° C. in a refrigerator for 24 hours;
- sterilize the third jar for 1 hour in an autoclave at 120° C. and then place the jar in a bath of cold water for 1 hour and store said jar at 4° C.±2° C. in a refrigerator for 24 hours;
- after 24 hours of storage, measure the viscosity of each jar (Brookfield helipath—stirring speed: 5 rpm).

The functional plant proteins according to the invention preferably have an emulsion capacity, measured according to test C, of between 700 000 mPa·s and 1 200 000 mPa·s and preferentially between 750 000 mPa·s and 1 200 000 mPa·s for a sample placed directly at 4° C. for 24 hours (with the exception of potato proteins, which have an emulsion capacity of between 400 000 mPa·s and 600 000 mPa·s for a sample placed directly at 4° C. for 24 hours), and between 500 000 mPa·s and 1 100 000 mPa·s for a sample treated at 75° C. and then placed at 4° C. for 24 hours.

The functional plant proteins according to the invention advantageously have, when they are in protein powder form (pulverulent proteins), a solids content of between 90% and 95% and preferentially greater than 92%, and a total protein content of greater than 60% on a dry basis. To determine the total protein content, assay of the soluble nitrogen fraction contained in the sample is performed according to the Dumas method, and the total protein content is then obtained by multiplying the nitrogen content expressed as a weight percentage of dry product by the factor 6.25. This method is well known to those skilled in the art.

The functional plant proteins according to the invention advantageously have a gel capacity, measured according to a test D, of between 10 000 mPa·s and 250 000 mPa·s and preferentially between 10 000 mPa·s and 50 000 mPa·s for a sample placed directly at 4° C. for 24 hours, and between 100 000 mPa·s and 500 000 mPa·s for a sample treated at 75° C. and then placed at 4° C. for 24 hours.

In the present invention, the gel capacity is measured according to test D described below:
- prepare a protein suspension by incorporating 50 g of sample (atomized functional plant protein powder) in 250.0 g of distilled water at 20±2° C. with vigorous stirring for 2 minutes at a speed of 250 rpm;
- fill 3 storage jars with the protein/water mixture;
- crimp seal the jars;
- place the first jar at 4° C.±2° C. in a refrigerator for 24 hours;
- pasteurize the second jar for 1 hr 30 minutes on a water bath at 75° C.±2° C. and then place the jar in a bath of cold water for 1 hour and store said jar at 4° C.±2° C. in a refrigerator for 24 hours;
- sterilize the third jar for 1 hour in an autoclave at 120° C. and then place the jar in a bath of cold water for 1 hour and store said jar at 4° C.±2° C. in a refrigerator for 24 hours;
- after 24 hours of storage, measure the viscosity of each jar (Brookfield helipath—stirring speed: 5 rpm).

In pulverulent form, the functional plant proteins according to the invention advantageously have a viscosity at 20° C.±2° C., measured according to test E, of greater than or equal to 20 000 mPa·s, preferentially greater than or equal to 21 000 mPa·s and even more preferentially between 21 000 mPa·s and 100 000 mPa·s.

In the present invention, the viscosity is measured according to test E described below:

prepare a protein suspension by incorporating 50.0 g of sample (atomized functional plant protein powder) in 250.0 g of distilled water at 20° C.±2° C. with vigorous stirring for 2 minutes at a speed of 250 rpm;

fill a storage jar with the protein/water mixture;

measure the viscosity of the contents of the jar (Brookfield helipath—stirring speed: 5 rpm) at 20° C.±2° C.

When the proteins are already in liquid form or in the form of an extract, place 250 ml of said liquid or extract in a storage jar and measure the viscosity of the contents of the jar (Brookfield helipath—stirring speed: 5 rpm) at 20° C.±2° C.

The functional plant proteins of the present invention also have an absence of decantation, i.e. excellent suspension behaviour, which greatly facilitates their use in industrial processes and thus represents a major advantage.

The suspension behaviour is measured in a 250 ml graduated cylinder. After reconstitution of a solution of 250 ml containing 15% of granulated powder according to the invention (the atomized plant proteins are hydrated for 10 minutes in demineralized water in order to overcome the ionic forces), the decanted volume is measured every hour for 7 hours, and then after 24 hours and 48 hours. There is no decantation of the granulated powder, even after waiting for 48 hours.

Advantageously, the functional plant proteins according to the invention have a hexanal content of less than 50 ng/g, and a content of 2-methoxy-3-(1-methylpropyl)pyrazine (noted P1) of less than 15 pg/g and preferentially less than 10 pg/g, and a content of 2-methoxy-3-isopropyl-5- or 6-methylpyrazine (noted P2) of less than 15 pg/g and preferentially less than 10 pg/g, and a content of 2-methyl-3-isopropylpyrazine (noted P3) of less than 15 pg/g and preferentially less than 10 pg/g.

The functional plant proteins according to the invention or that may be obtained via the process according to the invention make it possible to prepare compositions that are particularly suited to fields as diversified as the food sector, pharmacy, cosmetics, agrochemistry, construction materials and cardboards. Thus, the present invention relates in particular to compositions comprising at least one plant protein according to the invention or obtained via the process according to the invention, in particular a food, pharmaceutical, cosmetic or agrochemical composition. In particular, the present invention also concerns the use of a plant protein according to the invention or obtained via the process according to the invention in the manufacture of foods.

The invention will be understood more clearly on reading the examples that follow, which are intended to be illustrative by simply presenting certain embodiments and certain advantageous properties according to the invention, and nonlimiting.

Example 1

Preparation of Soluble and Functional Pea Proteins According to the Invention

Pea flour is prepared by grinding shelled fodder peas on an Alpine hammer mill equipped with a 100 μm grille.

300 kg of flour containing 87% solids are then soaked in water to a final concentration of 25% on a dry basis, at a pH of 6.5.

1044 kg of flour suspension containing 25% solids (i.e. thus 261 kg of dry flour) are then introduced with 500 kg of water into a hydrocyclone battery composed of 14 stages. It is fed with the flour suspension at stage No. 5.

This separation leads to the production of a light phase that corresponds to the output of stage No. 1. It consists of the mixture of proteins, internal fibre and soluble matter.

This light phase at the hydrocyclone outlet contains as a mixture (142 kg on a dry basis in total): fibre (about 14.8% by weight, i.e. 21 kg dry), protein (about 42.8% by weight, i.e. 60.8 kg dry) and soluble matter (about 42.4% by weight, i.e. 60.2 kg dry). This fraction has a solids content of 10%.

The fibre is separated out on Westfalia centrifugal decanters employed in an industrial starch unit for processing potato.

The light phase exiting the centrifugal decanter contains a mixture of protein and of soluble matter, whereas the heavy phase contains the pea fibre. The heavy phase contains 105 kg of fibre containing 20% solids. It is noted that virtually all of the fibre is indeed found in this fraction.

As regards the protein and soluble matter fraction, it contains 1142 kg of a mixture in solution of soluble matter and of protein (fraction containing 6% solids).

The protein was flocculated to its isoelectric point by adjusting the light phase exiting the centrifugal decanter to a pH of 4.5 and heating to 50° C.

The protein thus flocculated is left for 10 minutes in a maturation tank. Separation of the soluble matter/protein is then performed on a centrifugal decanter.

The mixture obtained at the outlet of the maturation tank then feeds the centrifugal decanter at a flow rate of 5 m³/h. A heavy phase or "soluble native protein extract" is obtained, with a solids content of 25%, a protein content of 85% ($N_{6.25}$) and a viscosity at 20° C.±2° C. of 30 000 mPa·s. The pH of 4.5 of the protein extract is rectified to a value of 6.6 by adding sodium hydroxide.

The protein extract thus obtained is subjected to a heat treatment of 122° C. for 0.2 s in a Simplex SDH infuser or infusion chamber, and it is then cooled to 45.5° C. by pressure reduction in an expansion vessel under vacuum or flash cooling. Finally, atomization is performed on an MSD (Multi Stage Dryer) tower under the following conditions.

An MSD atomization tower is chosen and is fed with the pea protein derived from the Simplex infuser. The drying air enters at 180° C. and leaves at 80° C., the static bed at the bottom of the tower being heated with air at 80° C.

At the outlet of the atomization tower, the product passes onto a vibrating fluid bed where it is cooled to room temperature. Recycling of the fines may advantageously be performed.

This set of operations allows the production of a pea protein powder in accordance with the invention, with a mean diameter of 200 μm and a mean density of 0.4.

Example 2

Preparation of Soluble and Functional Potato Protein According to the Invention 100 kg of potatoes are cleaned and grated on Nivoba brand rasps.

The grated potato is suspended in 10 kg of drinking water.

85 kg of red water is extracted from the mixture of grated potato and water on Westfalia centrifugal decanters, said red water having a solids content of 4.5% and a protein content of about 55%.

The protein contained in the red water is flocculated to its isoelectric point by adjusting the red water to a pH of 5 by adding hydrochloric acid (37%).

The protein is extracted in a Westfalia centrifugal decanter.

1.14 kg of pure protein is obtained, which is resuspended in water so as to obtain a protein extract containing 35% solids and a protein content of 85% ($N_{6.25}$).

The pH of the protein extract is rectified to a value of 7.0 by adding sodium hydroxide.

The protein extract thus obtained is subjected to a heat treatment of 125° C. for 0.8 s in a Simplex SDH infuser or infusion chamber, and is then cooled to 65° C. by pressure reduction in an expansion vessel under vacuum or flash cooling.

Atomization is finally performed on a Niro tower equipped with a turbine without recycling of the fine particles.

This set of operations allows the production of a potato protein powder in accordance with the invention, with a mean diameter of 80 μm and a mean density of 0.4.

Example 3

Comparative Example Before/After Heat Treatment (Pea Protein)

Pea protein SF, in accordance with the invention and prepared by applying the process described in Example 1 is compared, in Table I, with pea protein that has not been subjected to the functionalization process according to the invention (control s).

TABLE I

|  | S | SF |
|---|---|---|
| Flocculation temperature | 50 | 50 |
| Rectified pH | 6.6 | 6.6 |
| Infuser temperature | — | 122 |
| Flash cooling temperature | — | 45.5 |
| Solubility (%/dry) | 55.0 | 54.9 |
| Tg gel | 141 | 8 300 |
| Gel 4° C. | 4 000 | 44 000 |
| Gel 75° C. | 32 000 | 370 000 |
| Gel 120° C. | 200 000 | 720 000 |
| Tg emulsion | 40 000 | 1 000 000 |
| Emulsion 4° C. | 74 000 | 1 000 000 |
| Emulsion 75° C. | 100 000 | 1 000 000 |
| Emulsion 120° C. | 150 000 | 280 000 |
| EC (%) | 64.0 | 70.7 |

The SF pea protein in accordance with the invention shows better water solubility according to test A (percentage of solubility relative to the dry weight) and gel capacity ("Gel") measured according to test D that is higher, both at room temperature (Tg i.e. at 20° C.±2° C.) and at 4° C., 75° C. and 120° C., than the commercially available pea protein not functionalized according to the process of the invention.

Furthermore, the SF pea protein in accordance with the invention has an emulsion capacity ("Emulsion") measured according to test C that is much higher, both at room temperature (Tg at 20° C.±2° C.) and at 4° C., 75° C. and 120° C., and an emulsifying capacity ("EC") according to test B that is much higher than the commercially available pea protein not functionalized according to the process of the invention.

Example 4

Comparative Example Before/after Heat Treatment (Potato Protein)

Potato protein, SF, in accordance with the invention and prepared by applying the process described in Example 2 is compared, in Table II, with potato protein that has not been subjected to the functionalization process according to the invention (control s).

TABLE II

|  | S | SF |
|---|---|---|
| Flocculation temperature | 50 | 50 |
| Rectified pH | 7.0 | 7.0 |
| Infuser temperature | — | 125 |
| Flash cooling temperature | — | 65.0 |
| Solubility (%/dry) | 26.5 | 35.3 |
| Tg gel | 475 | 9 300 |
| Gel 4° C. | 6 300 | 40 000 |
| Gel 75° C. | 178 000 | 204 000 |
| Gel 120° C. | 260 000 | 550 000 |
| Tg emulsion | 163 000 | 197 000 |
| Emulsion 4° C. | 300 000 | 418 000 |
| Emulsion 75° C. | 225 000 | 540 000 |
| Emulsion 120° C. | 140 000 | 500 000 |
| EC (%) | 60.0 | 66.7 |

The SF potato protein in accordance with the invention shows better water solubility according to test A (percentage of solubility relative to the dry weight) and a gel capacity measured according to test D that is higher, both at room temperature (Tg i.e. at 20° C.±2° C.) and at 4° C., 75° C. and 120° C., than the potato protein not functionalized according to the process of the invention.

Furthermore, the SF potato protein in accordance with the invention has an emulsion capacity measured according to test C that is higher, both at room temperature (Tg at 20° C.±2° C.) and at 4° C., 75° C. and 120° C., and an emulsifying capacity according to test B, that is higher than that of the potato protein not functionalized according to the process of the invention.

Example 5

Comparative Example Concerning the Pyrazine and Hexanal Content of Pea Protein The hexanal content and the pyrazine content were measured for various samples. The term "pyrazines" means herein the combination of the following pyrazines: 2-methoxy-3-(1-methylpropyl)pyrazine (noted P1), 2-methoxy-3-isopropyl-5- or -6-methylpyrazine (noted P2) and 2-methyl-3-isopropylpyrazine (noted P3).

1. Compared Samples

Pea proteins, SF1 and SF2, in accordance with the invention and prepared by applying the process described in Example 1 were compared, in Table III, with pea proteins that have not been subjected to the functionalization process according to the invention (controls S1 and S2).

The pea proteins in accordance with the invention, SF1 and SF2, were also compared with pea proteins that have undergone decontamination processes well known to those skilled in the art, such as blanching (sample B1) or blanching combined with soaking in bicarbonate (sample B2). Pea protein B1 was obtained by blanching the raw material at 100° C. for 15 minutes. The peas were then ground and the pea protein B1 was extracted by isoflocculation (pH=4.5, flocculation temperature=50° C.) comparable to that performed on the pea protein in accordance with the invention. Pea protein B1 was obtained by blanching, as described above, preceded by a step of soaking the pea in 2% sodium bicarbonate solution for 18 hours.

The pea proteins in accordance with the invention, SF1 and SF2, were also compared with pea proteins obtained from competitor companies, Pisane F9 (Cosucra), Pisane M9 (Cosucra), Propulse (Parrheim), PPI (Pea Protein Isolate, ref. 700007651 Emsland staerke) and PP (Pea Protein, Emsland staerke).

2. Method for Classifying the Odours

The volatile compounds desorbed from pea protein extracts were classified according to the intensity of their plant odour or "green note", which is an olfactory descriptor well known to those skilled in the art. Certain samples also had an "animal note" (odour classification: "dustbins, animal feed, feet"); in this case, this was specified.

For this method for classifying the intensity of the "green note", 11 samples were analyzed by a sensory test of sniffing the dry samples and the samples at room temperature (20° C.±2° C.). The sniffing was performed under blind conditions in order to remove any influence of the extrinsic qualities of the products, by a group of 20 trained individuals isolated in individual cabins in a testing room. The sniffing was performed in compliance with the hygiene rules.

3. TDCPGSM Method

The volatile compounds desorbed from pea protein extracts were quantified. To do this, 11 samples were analyzed by the thermodesorption technique coupled to gas chromatography and to mass spectrometry (TDCPGSM).

The target compounds are:
hexanal;
2-methoxy-3-(1-methylpropyl)pyrazine (hereinbelow noted P1);
2-methoxy-3-isopropyl-5- or -6-methylpyrazine (hereinbelow noted P2);
2-methyl-3-isopropylpyrazine (hereinbelow noted P3).

The TDCPGSM analysis conditions are as follows: 1 g of sample is placed in a glass extraction cartridge (M3, Maillières Frères (Ets), Aubière, France) and is flushed with an inert gas ($N_2$) for preconcentrating the volatile molecules on a trap (stainless-steel tubes preconditioned and bouchés V 2 ABS.S— Tenax-Carbographe 1, SRA, France). The trapping is performed with a Thermo desorber Markes-Unity GC: 6890 Agilent/MS: 5973i Agilent machine, over 30 minutes at a flow rate of 70 ml/min.

The calibration curves were established by injecting, into a sampling tube, molecules diluted in methanol.

For all the analyses, 3 internal standards, chosen for their stability and their distribution over the chromatogram, were placed on the adsorbent trap before the sampling or before the injection of the compounds to be quantified.

The injection of the volatile molecules into the gas chromatograph coupled to the mass spectrometer is performed by thermal desorption of the absorbent trap. The separation of the volatile compounds was performed with an apolar capillary column.

The acquisitions of the compounds on the mass spectrometer were performed in SIM mode with 3 characteristic ions for each compound.

Establishment of the Calibration Ranges

Table III collates for each of the molecules the scales of the concentrations and of the equivalent masses (in ng or pg) for 10 µl of solution deposited on the trap.

TABLE III

| Concentrations | Standard 1 | Standard 2 | Standard 3 | Standard 4 | Standard 5 | Standard 6 |
|---|---|---|---|---|---|---|
| Hexanal (ppm) | 1 | 10 | 20 | 40 | 60 | 80 |
| Hexanal (ng) | 10 | 100 | 200 | 400 | 600 | 800 |
| P1 (ppb) | 0.5 | 1 | 3 | 5 | 7 | 10 |
| P1 (pg) | 5 | 10 | 30 | 50 | 70 | 100 |

For each compound, the curve represents the amount (in ng or in pg) of compound introduced onto the trap as a function of the area of the peak relative to the area of the standard peaks.

The calibration ranges for 2-methoxy-3-isopropyl-5- or -6-methyl-pyrazine (P2) and 2-methyl-3-isopropylpyrazine (P3) could not be established since these molecules do not exist in pure molecular form. Thus, the concentrations of these pyrazines are estimated as a function of 2-methoxy-3-(1-methylpropyl)pyrazine (P1).

For hexanal, two calibration curves had to be used, as a function of the concentration of this molecule. A range was established for concentrations below 20 ppm and a range for concentrations above 20 ppm.

Equation of the calibration curves:

Hexanal<20 ppm: Y=0.1857x−5.392 ($R^2$=0.9981) with Y, the mass of hexanal in ng and x, the area reported in the standards;

Hexanal>20 ppm: Y=0.3292x−164.5 ($R^2$=0.9995) with Y, the mass of hexanal in ng and x, the area reported in the standards;

P1: Y=76.752x−5.218 ($R^2$=0.9978) with Y, the mass of P1 in pg and x, the area reported in the standards.

Results

The calibration curves make it possible to calculate the mass (in ng or pg) of compounds trapped on the adsorbent tube and desorbed from 1 g of pea protein extract.

The concentrations of P2 and of P3 were estimated from the calibration curve for P1.

4. Results

TABLE IV

| Molecule | "Green note" odour classification | Hexanal (ng/g) | P1 (pg/g) | P2 (pg/g) | P3 (pg/g) |
|---|---|---|---|---|---|
| SF1 | Neutral | 6.5 | 7.9 | 0 | 7.2 |
| SF2 | The least pronounced green note | 3.4 | 4.9 | 1.8 | 5.6 |
| Pisane M9 | +very slight "animal" note | 23.9 | 8.7 | 154.5 | 7.2 |
| PP | | 99.7 | 0.0 | 0.0 | 1.8 |
| B2 | +very slight "animal" note | 3.6 | 2.6 | 44.7 | 24.0 |
| Pisane F9 | | 16.0 | 0.0 | 64.7 | 0.0 |
| B1 | | 8.0 | 11.0 | 123.1 | 6.4 |
| S2 | | 3.2 | 3.3 | 24.8 | 0.0 |
| S1 | The most pronounced green note | 34.9 | 3.3 | 98.5 | 10.2 |
| PPI* | Predominant "animal" note | 265.0 | 7.2 | 47.1 | 54.0 |

*For this sample, the "green note" odour classification was not possible since the "animal note" was predominant.

The pea proteins SF1 and SF2 in accordance with the invention have a much more neutral odour and a significantly lower content of hexanal and of each of the pyrazines P1, P2 and P3 than the pea proteins S1 and S2 that have not undergone the functionalization step according to the invention, and also than the pea proteins B1 and B2 extracted in a "standard" manner. The protein derived from blanched peas, with or without soaking, respectively B2 and B1, have low hexanal contents but high pyrazine contents.

Furthermore, the pea proteins SF1 and SF2 in accordance with the invention have a more neutral odour and a markedly lower hexanal and pyrazine content than the commercially available pea proteins (Pisane F9, Propulse, Pisane M9, PPI, PP) not functionalized according to the process of the invention.

Example 6

Functional Properties of Pea Proteins According to the Invention and of Pea Proteins According to the Prior Art Pea proteins (batches A to G) in accordance with the invention and prepared by applying the process described in Example 1 were analysed in terms of functional properties. The analyses are those described in the present application. The results are presented in Table V.

Pea proteins sold by manufacturers than the Applicant Company were also analyzed in terms of functional properties. The results are presented in Table VI.

TABLE V

| Batch | Rectified pH | % $N_{6.25}$/dry | Solubility | Emulsion 4° C. | Emulsion 75° C. | CE | Gel 4° C. | Gel 75° C. |
|---|---|---|---|---|---|---|---|---|
| A | 7.5 | 86 | 69.9 | 750 000 | 1 020 000 | 89.3 | 216 000 | 338 000 |
| B | 7.3 | 85.4 | 77.1 | 980 000 | 1 090 000 | 88.0 | 114 000 | 238 000 |
| C | 7.4 | 84.1 | 78.2 | 1 000 000 | 9 720 000 | 89.9 | 128 000 | 311 000 |
| D | 7.4 | 83.1 | 85.0 | 892 000 | 660 000 | 89.3 | 76 000 | 228 000 |
| E | 7.4 | nd | 66.7 | 1 010 000 | 802 000 | nd | 12 200 | 180 000 |
| F | 7.4 | nd | 62.9 | 766 000 | 900 000 | nd | 204 000 | 468 000 |
| G | 7.2 | 84.1 | 78.2 | 950 000 | 996 000 | 77.9 | 41 700 | 220 000 |

TABLE VI

| Trade name | PP CS | Propulse | Pisane M9 | Pisane HD | Pisane F9 | Pisane C9 | Envital E7 |
|---|---|---|---|---|---|---|---|
| Manuf. | Organo corp. | Nutripea LTD | Cosucra | Cosucra | Cosucra | Cosucra | Emsland |
| Solids | 93.0% | 91.5% | 94.9% | 94.4% | 94.1% | 94.1% | 91.4% |
| $N_{6.25}$/dry | 87.5% | 84.4% | 85.0% | 87.9% | 86.8% | 87.0% | 87.3% |
| Solub./dry | 22.2% | 22.7% | 32.8% | 23.2% | 22.9% | 22.7% | 36.0% |
| EC | 0% | 60.0% | — | 57.3% | 60.0% | 57.3% | 61.3% |
| Gel tq | 195 | 220 | 26 000 | 6 180 | 1 020 | 5 000 | 225 |
| Gel 4° C. | 520 | 1 320 | 120 000 | 11 880 | 5 800 | 30 000 | 2 800 |
| Gel 75° C. | 32 600 | 2 600 | 300 000 | 50 000 | 144 000 | 130 000 | 130 000 |
| Gel 120° C. | 18 000 | 140 000 | 165 000 | 40 000 | 100 000 | 55 000 | 55 000 |
| Emulsion Tq | 5 200 | 1 600 | 850 000 | 70 000 | 425 000 | 636 000 | 636 000 |
| Emulsion 4° C. | 2 120 | 1 720 | 950 000 | 114 000 | 698 000 | 790 000 | 790 000 |
| Emulsion 75° C. | 2 040 | 1 920 | 880 000 | 136 000 | 500 000 | 710 000 | 710 000 |

TABLE VI-continued

| Trade name | PP CS | Pro-pulse | Pisane M9 | Pisane HD | Pisane F9 | Pisane C9 | Envital E7 |
|---|---|---|---|---|---|---|---|
| Emulsion 120° C. | 2 000 | 3 400 | 180 000 | 30 000 | 145 000 | 150 000 | 150 000 |

Manuf. = Manufacturer;
Solub. = Solubility

None of the pea proteins sold by manufacturers other than the Applicant Company has a water solubility, measured according to a test A, of greater than 50%. Moreover, none of these same proteins has an emulsifying capacity (EC), measured according to test B, of between 70% and 95%.

Example 7

Manufacture of Frankfurter Sausages from SF Pea Protein According to the Invention Frankfurter sausages were prepared using especially SF pea protein in accordance with the invention prepared by applying the process described in Example 1.
A. Formula for the Manufacture of Frankfurter Sausages, Fine Emulsion
Composition (Percentages Expressed on a Weight Basis)
  Pork meat: 30.0%
  Water/crushed ice: 26.9%
  Pork fat: 20.0%
  Pork belly: 18.2%
  Sodium polyphosphates: 3.0%
  Nitrite salt: 1.5%
  SF pea protein: 1.5%
  Dextrose: 1%
  Glucono-Delta-Lactone: 0.3%
  Seasoning: 0.3%
  Total: 100.0%
B. Method
  Mince the pork meat, fat and belly separately.
  Prepare a mixture with water (4° C.), crushed ice, GDL and dextrose. Under vacuum, in a Stephan "cutter" cooled to 4° C., incorporate the ingredients while keeping to the order, the time and the cuttering speed below:
  Pork meat and polyphosphates+nitrite salt: 0 min, 1500 rpm
  ⅕ of the aqueous solution: 2 min 20 s, 1500 rpm
  SF pea protein: 3 min, 1500 rpm
  ⅗ of the aqueous solution: 3 min 20 s, 1500 rpm
  Pork fat and belly: 4 min 10 s, 1500 rpm
  Seasoning: 5 min, 3000 rpm
  ⅕ of the aqueous solution: 5 min 30 s, 3000 rpm
  End T°<14° C.: 9 min, 3000 rpm
  Emboss the sausages.
  Cook the sausages in an oven at controlled humidity:
  Baking 20 min at 55° C.-30% HR;
  Fuming 20 min at 55° C.-50% HR.
  Cooking at 75° C.-100% HR up to 72° C. at the core.
C. Characterization
  The sausages thus formed were analysed with an Instron texturometer in order to evaluate their hardness and their elasticity after storage for one week at 4° C.
  The firmness or hardness characterizes the resistance of a material to localized plastic deformation.
  The elasticity is the ability of a material to resume its initial form once the deformation imposed thereon is removed.
  Rotor: Flat punch 40*20; measuring cell: 100 N; travelling speed: 30 mm/min; imposed deformation: 30% of the height of the sample. Temperature: 20° C.

|  | Small sausages | | | |
|---|---|---|---|---|
|  | Cold | | Heated | |
|  | Hardness (N) ±1 N | Elasticity (%) ±5% | Hardness (N) ±1 N | Elasticity (%) ±5% |
| Nutralys SP | 5.7 | 65 | 3.8 | 54 |

Example 8

Manufacture of Spreadable Processed Cheese from SF Pea Protein According to the Invention, Comparison with a Cheese of the Same Type A—A spreadable processed cheese was produced from SF pea protein in accordance with the invention prepared by applying the process described in Example 1 or from pea protein that has not been subjected to the functionalization process according to the invention (control S).
Formula
A. Formula
  Cheddar: 32.73%
  Rennet casein: 3.50%
  Butter: 9.06%
  JOHA S9: 1.20%
  JOHA S4: 1.20%
  JOHA T-Neu: 0.13%
  SF or S pea protein: 1.64%
  CLEARAM® CH3020: 2.00%
  Water: 48.54%
  Total: 100.00%
  Solids: 37.5%
B. Procedure
  Preheat the Stefan to 100° C. by injecting steam into the jacket
  Add the ingredients
  Mix at 300 rpm for 30 seconds
  Mix at 3000 rpm up to 95° C.
  Maintain for 3 min at 95° C.
  Package
C. Sensory Analyses
  The cheeses containing the SF or S pea proteins were presented blind to a panel of 16 testers.
  The testers gave their opinion regarding the detected differences (yes/no) in terms of odour and taste and they were required to identify their preferred cheese.

| Number of replies | 16 | | | |
|---|---|---|---|---|
| Can you detect differences? | Yes | No | No answer | Total |

| -continued | | | | |
|---|---|---|---|---|
| regarding the odour | 1 | 14 | 1 | 16 |
| regarding the taste | 10 | 6 | | 16 |
| Which cheese do you prefer? | | | | |
| S pea protein | 1 | | | |
| SF pea protein | 11 | | | |
| no answer | 4 | | | |
| Total | 16 | | | |

Comments regarding the products:
with the SF protein
Shinier cheese
Less piquant, milder taste
More pronounced cheese taste
Shorter texture
with the S protein:
Yellower cheese
More piquant taste

The invention claimed is:

1. A process for manufacturing non-denatured soluble and functional pea proteins, comprising:
   a step of heating a protein extract comprising soluble pea proteins, said protein extract having a solids content of greater than 15% by weight and a protein content of greater than 60% on a dry basis to a temperature of 100° C. to 160° C. for 0.01 to 1 second; and
   a step of cooling said heated protein extract.

2. The process according to claim 1, wherein the heating step is performed by heat exchange with water vapour.

3. The process according to claim 1, wherein the step of cooling of the heated protein extract is performed by lowering the pressure below 300 mbar absolute.

4. The process according to claim 1, wherein said method comprises, prior to the heating step:
   1) suspending a plant flour pea flour in water;
   2) extracting the starch and the fibre from the pea flour in suspension so as to obtain a protein suspension with a solids content of 3% to 15% by weight; and
   3) extracting from said protein suspension a protein extract with a solids content of greater than 15% by weight, thereby obtaining a soluble pea protein extract for heating.

5. The process according to claim 4, wherein said process comprises, before or after the heating step, a step of adjusting the pH of the protein extract to between 6.2 and 9.

6. The process according to claim 4, wherein the protein extract subjected to heating has a viscosity at 20° C.±2° C., measured according to a test E, of between 10,000 mPa·s and 100,000 mPa·s.

7. The process according to claim 1, wherein said method further comprises a step of atomization of the heated functional pea protein redissolved in water.

8. A process for transforming non-denatured non-functional pea protein into non-denatured functional pea protein, comprising:
   a step of heating soluble pea protein to a temperature of 100° C. to 160° C. for 0.01 to 1 second; and
   a step of cooling of the heated soluble pea protein.

* * * * *